No. 816,240. PATENTED MAR. 27, 1906.
C. F. C. MEHLIG.
FLEXIBLE SHAFT.
APPLICATION FILED MAY 22, 1905.
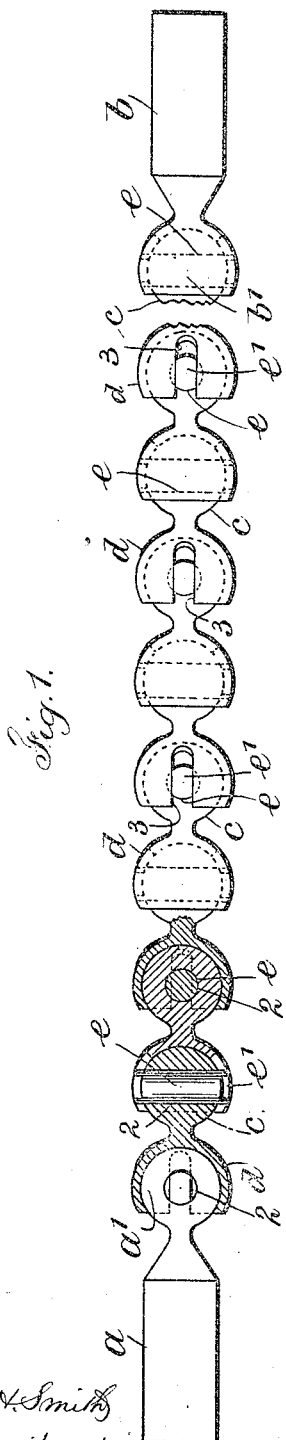
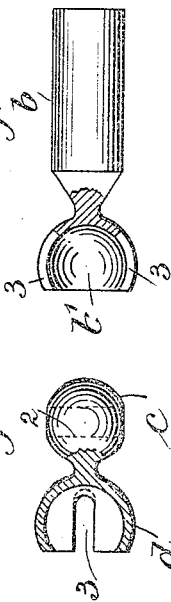
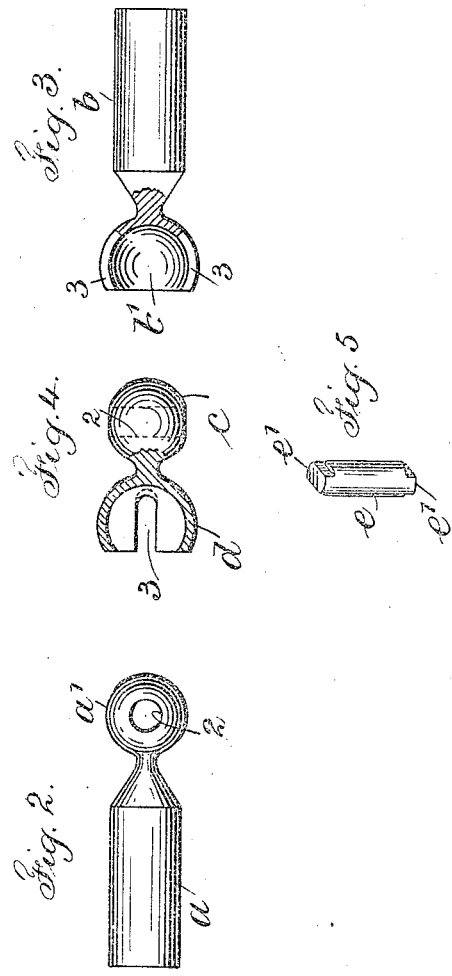
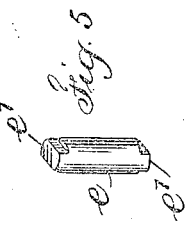
Witnesses
Chas H. Smith
S. T. Haviland.
Inventor.
Charles F. C. Mehlig.
per Harold Serrell
Atty

UNITED STATES PATENT OFFICE.

CHARLES F. C. MEHLIG, OF NEW YORK, N. Y.

FLEXIBLE SHAFT.

No. 816,240.  Specification of Letters Patent.  Patented March 27, 1906.

Application filed May 22, 1905. Serial No. 261,489.

*To all whom it may concern:*

Be it known that I, CHARLES F. C. MEHLIG, a citizen of the United States, residing at the borough of Manhattan, in the city, county, and State of New York, have invented an Improvement in Flexible Shafts, of which the following is a specification.

My invention relates to a flexible shaft adapted for transmitting movement and power from the driving-shaft of a fixed or unitary prime mover to the driven shaft of some mechanical structure or tool in line therewith or at any dersired or necessary inclination or angle thereto.

My invention is applicable for general uses in the arts and manufactures, and is especially adapted for use in dental engines and similar appliances or light machinery; and the object of my invention is to produce a flexible shaft especially for such use that shall not only be light in weight and compact in form, but one in which there shall be substantially no lost motion or backlash and a maximum amount of freedom of movement in any departure from a straight line or in any angle.

In carrying out my invention, and in combination with the ends of the driving and driven shafts having sphere or socket terminations, I employ a series of similar parts each comprising a sphere and socket preferably made integral, the spheres and sockets progressively alternating, so that each socket receives and engages a sphere. The spheres are perforated to receive axial pins and the sockets provided with central opposite slots from their edges inward receiving the ends of the pins. The ends of the axial pins are preferably reduced and provided with opposite flat faces adapted to bear against the opposite faces of the slots. I have shown and prefer to place the axial pins of adjacent spheres at right angles to one another, so as to perceptibly increase the flexibility of the connected parts forming the shaft. Each integral socket and sphere is preferably formed or turned from a solid block of metal and bored out to receive the spheres, the sockets comprising about two hundred and fifty degrees of the circle in order to engage the spheres effectively.

In the drawings, Figure 1 is an elevation and partial section illustrating the device of my invention, the parts being broken through to indicate indefinite length. Fig. 2 is an elevation of the driving-shaft end and its sphere. Fig. 3 is an elevation and partial section of the driven shaft end and its socket. Fig. 4 is an elevation and partial section of a connected sphere and socket, and Fig. 5 a perspective view of one axial pin.

$a$ represents one end of the driving-shaft of a fixed or unitary prime mover on the free end of which there is an integral sphere $a'$, having a central aperture 2.

$b$ represents the end of the driven shaft of some mechanical structure or tool, and $b'$ a socket integral therewith and on the free end thereof, and which socket is provided with opposite slots 3, formed in from the edges thereof. The similar parts in series each comprise a sphere $c$ and socket $d$, preferably formed integral. These parts are advantageously turned from a block of metal and the sockets bored out to receive the spheres, after which the sockets are turned in upon the spheres to engage and hold the same, said sockets each being preferably about two hundred and fifty degrees of the circle in order to engage the spheres effectively. These spheres and sockets are arranged so as to progress alternately, each socket engaging an adjacent sphere. Axial pins extend through the apertures 2 of the spheres, $e$ representing the body of each axial pin and $e'$ the reduced ends thereof. These reduced ends in one direction are of the width of the axial pins, the reduction being formed by making opposite flat faces in which the reduced ends between the faces are of a width agreeing with the width of the slots, so that the flat faces bear on opposite sides of the slots, the points of contact thus being liberal and providing for wear. The axial pins, because of the flat ends in the slots are obliged to turn in the spheres. I have shown and prefer to employ the axial pins of adjacent spheres at right angles to one another, so as to increase the flexibility of the connected parts forming the shaft, as practice goes to prove that because of this construction there is greater flexibility and possibility of movement of the parts. Furthermore, the useful life of the pins and slots is increased by the pins being round and turning in the spheres and the flat opposite faces of the pins moving through the slots.

The construction shown and described herein for my flexible shaft admits of the same being made of any size, according to the use to which the shaft is to be put, as it is adapted in large sizes for heavy work as well as in small and light sizes for dental engines and similar or like machines.

I claim as my invention—

1. A flexible shaft, consisting of a series of similar connected parts, each part comprising a sphere and socket, axial pins connecting the same for turning movement, and shaft-end terminations.

2. A flexible shaft, consisting of a series of similar connected parts, each part comprising a sphere and integral socket, the sockets engaging the spheres in progression and slotted from the edges inward at opposite sides and the spheres centrally perforated, axial pins in said perforations with reduced ends in the slots of the sockets, and shaft-end terminations.

3. A flexible shaft, consisting of a series of similar connected parts, each part comprising a sphere and integral socket, the sockets engaging the spheres in progression and slotted from the edges inward at opposite sides, and the spheres centrally perforated, axial pins in said perforations with reduced ends having flat opposite faces, said flat faces contacting with the parallel opposite edges of the slots and moving through the slots, compelling the axial pins to turn in the spheres, and shaft-end terminations.

4. A flexible shaft, comprising a driving-shaft end and sphere termination, a driven shaft end and socket termination, and an intervening series of similar unitary parts, each part comprising a sphere and socket, the sockets engaging the spheres and the parts being free to move in relation to one another, the sockets being provided with opposite slots in line with the said connected parts, and the spheres with axial pins with the ends of the pins received and movable in the slots of the sockets.

5. A flexible shaft, comprising a driving-shaft end and sphere termination, a driven shaft end and socket termination, and an intervening series of similar unitary parts, each part comprising a sphere and socket, the sockets engaging the spheres and the parts being free to move in relation to one another, the sockets being provided with opposite slots in line with the said connected parts, and the spheres with axial pins having reduced ends with flattened opposite faces, the said ends being received in the slots, which in width agree with the width of the flattened ends of the pins, so that the flattened faces bear upon opposite edges of the slots and move through the slots, compelling the pins to move in the spheres.

Signed by me this 19th day of May, 1905.

C. F. C. MEHLIG.

Witnesses:
GEO. T. PINCKNEY,
S. T. HAVILAND.